United States Patent
Liu

(10) Patent No.: US 9,940,050 B2
(45) Date of Patent: Apr. 10, 2018

(54) APPARATUS AND METHOD TO SPEED UP MEMORY FREQUENCY SWITCH FLOW

(71) Applicant: MediaTek Inc., Hsin-Chu (TW)

(72) Inventor: Te-Ping Liu, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 352 days.

(21) Appl. No.: 14/874,832

(22) Filed: Oct. 5, 2015

(65) Prior Publication Data

US 2017/0097788 A1   Apr. 6, 2017

(51) Int. Cl.
*G06F 3/06* (2006.01)
*G06F 13/16* (2006.01)

(52) U.S. Cl.
CPC .......... *G06F 3/0625* (2013.01); *G06F 3/0634* (2013.01); *G06F 3/0659* (2013.01); *G06F 3/0673* (2013.01); *G06F 13/16* (2013.01); *G06F 13/1642* (2013.01)

(58) Field of Classification Search
CPC .... G06F 3/0625; G06F 3/0634; G06F 3/0659; G06F 3/0673; G06F 13/16; G06F 13/1642
See application file for complete search history.

(56) References Cited

U.S. PATENT DOCUMENTS

| | | | | |
|---|---|---|---|---|
| 5,809,270 A * | 9/1998 | Robbins | ................ | G06F 9/3867 375/E7.093 |
| 7,430,676 B2 * | 9/2008 | Baker | ................... | G06F 1/3203 365/226 |
| 2003/0110350 A1 * | 6/2003 | McGee | ............... | G06F 13/1642 711/108 |
| 2004/0047209 A1 * | 3/2004 | Lien | ...................... | G11C 7/1075 365/202 |
| 2007/0183192 A1 * | 8/2007 | Barnum | ............... | G06F 13/1642 365/180 |
| 2009/0190429 A1 * | 7/2009 | Brittain | ................. | G06F 1/3203 365/233.1 |
| 2010/0131724 A1 * | 5/2010 | Miura | ................. | G06F 13/4243 711/154 |
| 2010/0313052 A1 * | 12/2010 | Ueda | ..................... | G06F 1/3225 713/324 |
| 2011/0235459 A1 * | 9/2011 | Ware | ........................ | G11C 7/04 365/233.11 |
| 2011/0261603 A1 * | 10/2011 | Jones | ..................... | G06F 13/385 365/63 |

(Continued)

*Primary Examiner* — Vu Le
*Assistant Examiner* — Sung Cho
(74) *Attorney, Agent, or Firm* — McClure, Qualey & Rodack, LLP

(57) ABSTRACT

A computing system for accessing a dynamic random access memory (DRAM) includes a processing circuit, a queue, and a DRAM controller. The processing circuit is configured for issuing an early notification signal before issuing a clock frequency switch signal; the early notification signal notifies upcoming of the clock frequency switch signal and the clock frequency switch signal requests a change of frequency of a DRAM clock. The queue has N entries and each entry stores at least an address and an associated command to be sent to the DRAM. The DRAM controller is configured for controlling access to the DRAM and the DRAM controller manages to decrease occupancy of the queue to a target level upon receiving the early notification signal.

18 Claims, 6 Drawing Sheets

(56) References Cited

U.S. PATENT DOCUMENTS

| | | | |
|---|---|---|---|
| 2012/0173836 A1* | 7/2012 | Yermalayeu | G06F 13/1689 711/167 |
| 2013/0083611 A1* | 4/2013 | Ware | G11C 11/4072 365/191 |
| 2014/0112089 A1* | 4/2014 | Tsang | G11C 8/18 365/233.1 |
| 2015/0016378 A1* | 1/2015 | Urabe | H04L 29/06 370/329 |

* cited by examiner

APPARATUS AND METHOD TO SPEED UP MEMORY FREQUENCY SWITCH FLOW

BACKGROUND OF THE INVENTION

Field of the Invention

The invention relates to a dynamic random access memory (DRAM) controller and DRAM control method, and more particularly, to a method for speeding up memory clock frequency change flow within a computing system, and an apparatus thereof.

Description of the Related Art

Dynamic random access memory (DRAM) is a type of volatile memory that stores each data bit in an individual capacitor. DRAM has a variety of forms such as synchronous DRAM (SDRAM), double data rate (DDR) SDRAM, DDR2 SDRAM, and DDR3 SDRAM, which have different respective densities or operating speeds.

A memory controller, such as a DRAM controller, is a circuit that manages the flow of data to and from a memory such as DRAM. The memory controller controls reading and writing by selecting row and column data addresses of the memory.

As modern computing systems are required to provide more computing capability, integrated circuit (IC) chips or system on chip (SoC) within these computing systems are operating at increasingly faster clock speeds. At the same time, these IC chips consume more power due to faster clock speeds. However, in many computing environments such as a mobile computing system, it is desirable to reduce power consumption. One common technique to save power is to dynamically manage system power consumption through clock-frequency scaling. For example, the clock frequency for an IC may be reduced during periods of operation when the workload is light, thereby reducing power consumption. Note that, when the workload increases again, the clock frequency can be restored to its previous level.

A memory subsystem within a computer system consumes a significant amount of power. Hence, providing power savings in a memory subsystem through dynamic clock-frequency scaling is not uncommon. Changing the clock frequency of a DRAM typically involves: pausing or discarding all outstanding memory subsystem operations; changing the DRAM clock frequency to a new value; and resuming or repeating the memory operations. Unfortunately, suspending memory operations for a long period of time during clock frequency changes is not desirable for many applications, in particular during real-time applications such as audio and video playback. In order not to suffer system performance degradation, fastening the clock frequency change flow of a DRAM subsystem as quickly as possible while satisfying relevant DRAM operation timing constraints to avoid a system malfunction is needed.

Hence, there is a need for a clock frequency changing technique to speed up the DRAM clock frequency change flow efficiently.

BRIEF SUMMARY OF THE INVENTION

A computing system for accessing a dynamic random access memory (DRAM) and a DRAM accessing method are provided. An exemplary embodiment of the computing system comprises a processing circuit, a queue, and a DRAM controller. The processing circuit is configured for issuing an early notification signal before issuing a clock frequency switch signal, wherein the early notification signal notifies upcoming of the clock frequency switch signal and the clock frequency switch signal requests a change of frequency of a DRAM clock. The queue comprises N entries, wherein N is a positive integer and each entry stores at least an address and an associated command to be sent to the DRAM. The DRAM controller is configured to control access to the DRAM, wherein the DRAM controller manages to decrease occupancy of the queue to a target level upon receiving the early notification signal.

An exemplary embodiment of the DRAM accessing method is provided. The DRAM accessing method comprises the steps of: issuing, by a processing circuit, an early notification signal before issuing a clock frequency switch signal, wherein the early notification signal notifies upcoming of the clock frequency switch signal and the clock frequency switch signal requests a change of frequency of a DRAM clock; storing address and command signals to be sent to a DRAM into a queue having N entries, wherein each entry stores at least an address and associated command; decreasing gradually, by a DRAM controller, occupancy of the queue to a target level upon receiving the early notification signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed descriptions of well-known functions and structures are omitted to avoid obscuring the subject matter of the invention.

It should be noted that different references to "an" or "one" embodiment in this disclosure are not necessarily to the same embodiment, and such references mean at least one. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

The computing system according to an embodiment of the invention may be implemented as or within an electronic device; the electronic device may be, but is not limited to, a Personal Digital Assistant (PDA), a smartphone, a tablet Personal Computer (PC), a Portable Multimedia Player (PMP), an electronic book terminal, a notebook PC, a netbook computer, or an Ultra Mobile Personal Computer (UMPC).

Figure 1:
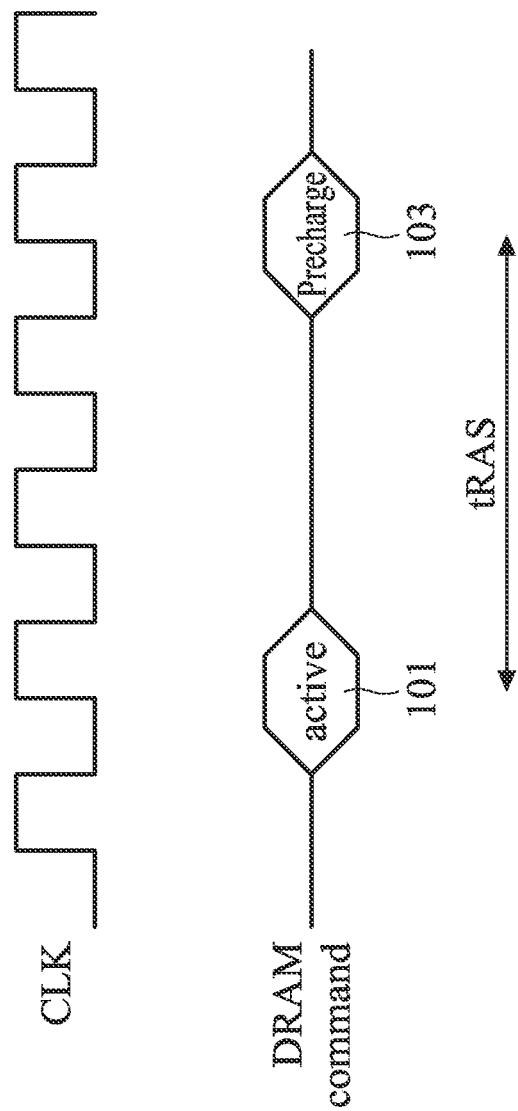
FIG. 1 shows a timing diagram illustrative of timing constraints imposed on a command signal for writing data to a DRAM.

FIG. 1 shows a timing diagram illustrative of timing constraints imposed on a command signal for accessing a DRAM. For the sake of brevity, an associated address signal and data signal waveforms for the DRAM are omitted. In the timing diagram, the active command 101 indicates a row access time during which a row address is issued from a DRAM controller to a DRAM, and the precharge command 103 indicates a precharge command time during which a precharge command is issued from the DRAM controller to the DRAM. It is noted that a row active time tRAS, defined in a particular specification for the DRAM, is needed between the active command 101 and the precharge command 103. In other words, the active time tRAS requires an absolute timing gap between activating a row of the DRAM and pre-charging the activated row of the DRAM. For example, when the active time tRAS is 20 ns, the DRAM controller cannot issue the precharge command 103 to the DRAM within 20 ns after issuing the active command 101. To satisfy the tRAS requirement, the DRAM controller may use a counter to count a corresponding clock cycle number of a clock for the DRAM controller and/or the DRAM. For example, if the clock CLK for the DRAM subsystem has a frequency of 200 MHz (i.e. the clock cycle is 5 ns), the DRAM controller would do the following: issue the active command 101; count at least 4 clock cycles of the clock CLK; and issue the precharge command 103. The DRAM controller can, of course, count many more than 4 clock cycles; however, system efficiency may decrease as a greater timing gap than necessary (e.g. much larger than the active time tRAS) is reserved.

When the frequency of the clock CLK is changed, the corresponding clock cycle count for satisfying the active time tRAS requirement may change as well. For instance, if the frequency of the clock CLK is switched from 200 MHz to 500 MHz, the DRAM controller has to count at least 10 clock cycles of the clock CLK under the new clock frequency instead of 4 clock cycles. Otherwise, the timing margin between the active command 101 and the precharge command 103 will not be large enough to meet the DRAM specification and an error may occur during access to the DRAM.

To manage the DRAM clock frequency change while preserving system efficiency, one solution is to record minimum clock cycle counts for different sets of command signal, address signal, and data signal. For instance, command signals sent from a DRAM controller to a DRAM shortly before and after a clock frequency change may be categorized into two groups: for those command signals belonging to a first group, the DRAM controller counts N1 clock cycles between issuing an active command and a precharge command; for those command signals belonging to a second group, the DRAM controller counts N2 clock cycles. This solution, however, complicates the DRAM controller design and is prone to errors.

Figure 2:
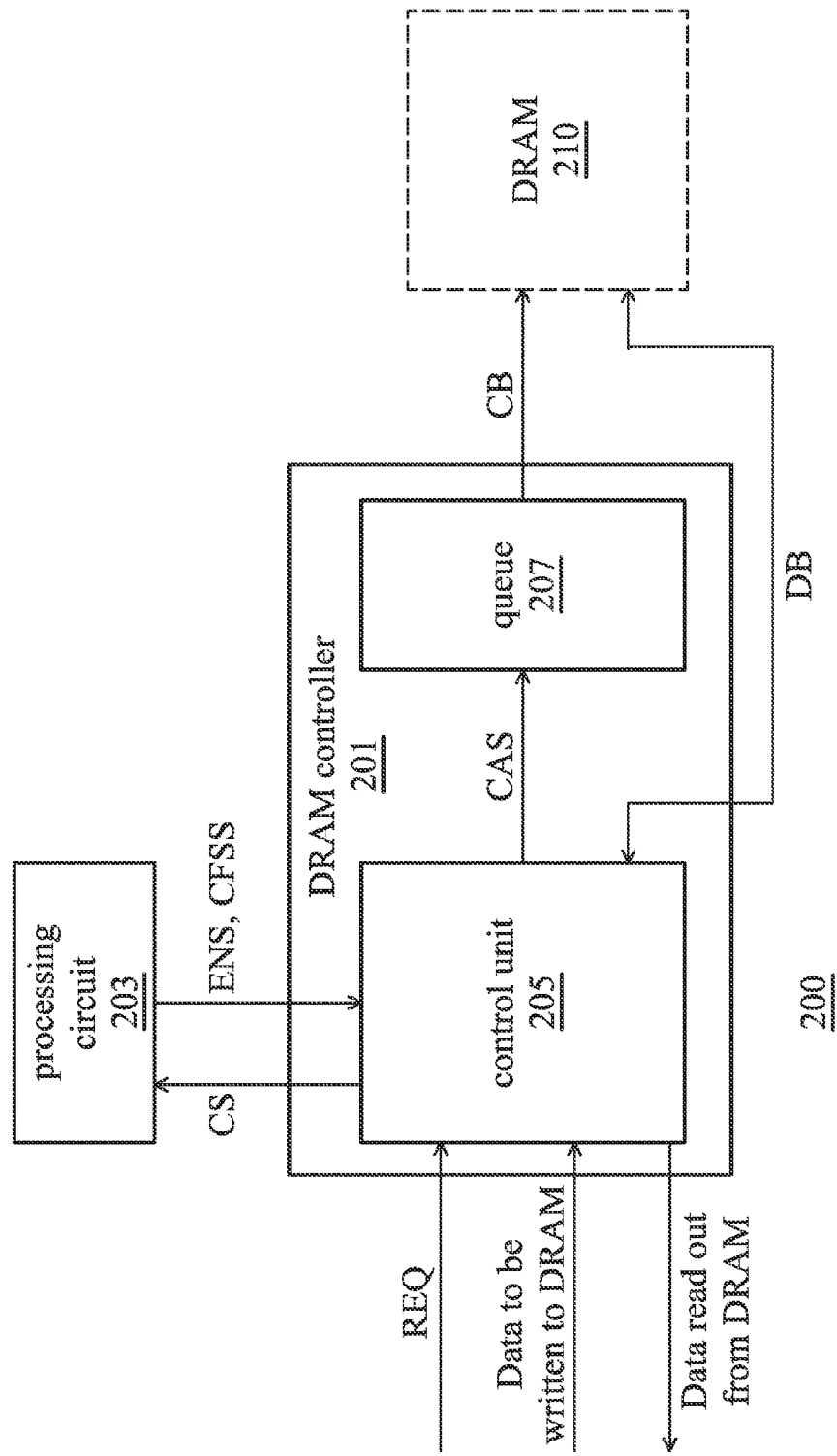
FIG. 2 illustrates a block diagram of a DRAM subsystem according to another embodiment of the invention.

To illustrate an alternative solution, please begin with FIG. 2, which illustrates a block diagram of a DRAM subsystem 200 according to some embodiments of the invention. As shown in FIG. 2, the DRAM subsystem 200 comprises a DRAM controller 201 and a processing circuit 203. The DRAM controller 201 is coupled to the DRAM 210 through a command bus CB and a data bus DB. In response to a request REQ (usually a read/write request) from a computing unit such as a central processing unit (CPU) (not shown in FIG. 2), the DRAM controller 201 accordingly controls the read/write operation of the DRAM 210; thereby, controlling data, requested by the CPU, to be read out from or written into the DRAM 210 via the data bus DB. In practice, the DRAM subsystem 200 is fabricated within an integrated circuit (IC) chip; in contrast, the DRAM 210 is outside the IC (off-chip) and may be integrated with the IC chip on a printed circuit board (PCB) within an electronic device. The processing circuit 203 may be any combination of CPUs, GPUs, DSPs and/or other types of processors or any computing units; and some of the requests REQ may be issued forth from the processing circuit 203.

More specifically, the DRAM controller 201 comprises a control unit 205 and a queue 207. The control unit 205 may be combinations of sequential circuits and combinational circuits and the queue 207 may be implemented by registers or static random access memory (SRAM) and any combinations thereof. The control unit 205 receives the request REQ and prepares corresponding command and address signal CAS accordingly for storing (i.e. push) into the queue 207. The queue 207 may store up to N (a positive integer) pairs of command and address signal CAS that are to be sent to the DRAM 210. As N increases, the overall system performance may increase as well due to the better capability of concurrently processing requests from multiple computing units. To issue a command to the DRAM 210, the control unit 205 may execute a pop operation on the queue 207 so that a stored entry of the command and address signal CAS is popped out from the queue 207 and sent to the DRAM 210 via the command bus CB. The control unit 205 has to take care of the absolute timing margin between two consecutive pop operations as mentioned regarding FIG. 1. Note that, although the queue 207 is drawn to store a command signal and address signal for the DRAM 210, it is feasible that the queue 207 also stores those data to be written to the DRAM as well. It also has to be emphasized that there may be other detailed implementation choices pertaining to the DRAM controller 201, which shall be construed as being within the scope of this invention. For instance, the queue 207 may physically reside outside the DRAM controller 201.

When the clock frequency for the subsystem 200 (and for the DRAM 210) is about to be changed, the processing circuit 203 issues an early notification signal ENS in advance. The early notification signal ENS serves to notify the DRAM controller 201 that a clock frequency change is going to take place in the near future (say, within 5 ms). When the DRAM controller 201 receives the early notification signal ENS, it starts to decrease occupancy of the queue 207 to a target level. For example, when the DRAM controller 201 receives the early notification signal ENS, all of the 8 entries of the queue 207 are occupied; and then the DRAM controller 201 reduces the occupancy of the queue 207 to 2 out of 8 entries (i.e. the target level is 2) during a certain time span before receiving a clock frequency switch signal CFSS, which requests a change of the clock frequency.

When the processing circuit 203 sends the clock frequency switch signal CFSS to the DRAM controller 201, the DRAM controller 201 stops pushing any command and address signal CAS into the queue 207 temporarily. That is, the DRAM controller 201 declines any push request generated due to the request REQ from any computing unit.

During this period, the DRAM controller 201 pops out the remaining occupied entries (e.g. 2 out of 8 entries) of the queue 207 to the DRAM 210. Once the queue 207 is in full vacancy, the DRAM controller 201 then issues a clearance signal CS to the processing circuit 203 to indicate that the clock frequency for the DRAM controller 201 and/or the DRAM 210 can be changed. Then, the processing circuit 203 may switch the clock CLK to a new frequency under which the DRAM subsystem 200 may operate.

With the reduction of the occupancy of the queue 207 upon receiving the early notification signal ENS, the time interval between receiving the clock frequency switch signal CFSS and issuing the clearance signal CS is effectively shortened. This is because, for example, reducing 2 occupied entries to null is much faster than reducing 2 or more occupied entries (say, 8 occupied entries) to null. For the processing circuit 203, it "feels" that a time interval between requesting a clock frequency change (when issuing the clock frequency switch signal CFSS) and being able to change the clock frequency (when receiving the clearance signal CS) becomes smaller. Henceforth, any computing unit in need of accessing the DRAM 210 is kept waiting for a shorter time during the clock frequency switch process regarding the DRAM subsystem 200, and performance suffers less.

Also, at the time instant that the processing circuit 203 switches the clock CLK for the DRAM subsystem 200 from a first frequency to a second frequency, all the commands prepared to satisfy the timing requirement under the first frequency have been completely sent to the DRAM 210. As such, there is no need for the DRAM controller 201 to record which commands belong to which clock frequencies. The DRAM controller 201 just needs to calculate a new clock cycle count under the second frequency for meeting the requirement of the DRAM timing interval between two commands.

Thus, according to an embodiment of the invention, a computing system for accessing the DRAM 210 comprises the following circuits. The processing circuit 203 is configured for issuing the early notification signal ENS before issuing the clock frequency switch signal CFSS, wherein the early notification signal notifies upcoming of the clock frequency switch signal CFSS and the clock frequency switch signal CFSS requests a change of frequency of a DRAM clock. The queue 207 comprises N entries, wherein N is a positive integer and each entry stores at least an address and an associated command to be sent to the DRAM 210. The DRAM controller 201 is configured to control access to the DRAM 210, wherein the DRAM controller 201 manages to decrease occupancy of the queue 207 to a target level upon receiving the early notification signal ENS.

In one embodiment of the invention, the target level mandates at most M out of N entries of the queue 207 be occupied, wherein M is a positive integer smaller than N.

In another embodiment of the invention, after receiving the clock frequency switch signal CFSS from the processing circuit 203, the DRAM controller 201 forbids any push request on the queue as the occupancy of the queue remains non-zero. In yet another embodiment, when the occupancy of the queue 207 falls to zero after receiving the clock frequency switch signal CFSS, the DRAM controller 201 issues the clearance signal CS to the processing circuit to indicate that the frequency of the DRAM clock can be changed. According to another embodiment of the invention, the processing circuit 203 switches the frequency of the DRAM clock from a first frequency to a second frequency upon receiving the clearance signal CS.

According to an embodiment of the invention, the DRAM controller 201 maintains at least X cycles of the DRAM clock between adjacent pop operations on the queue 207 before the changing of the frequency of the DRAM clock, wherein X is a positive value (e.g. 3.5); and the DRAM controller maintains at least Y cycles of the DRAM clock between adjacent pop operations on the queue 207 after the changing of the frequency of the DRAM clock, wherein Y is a positive value that is different from X.

Figure 3:
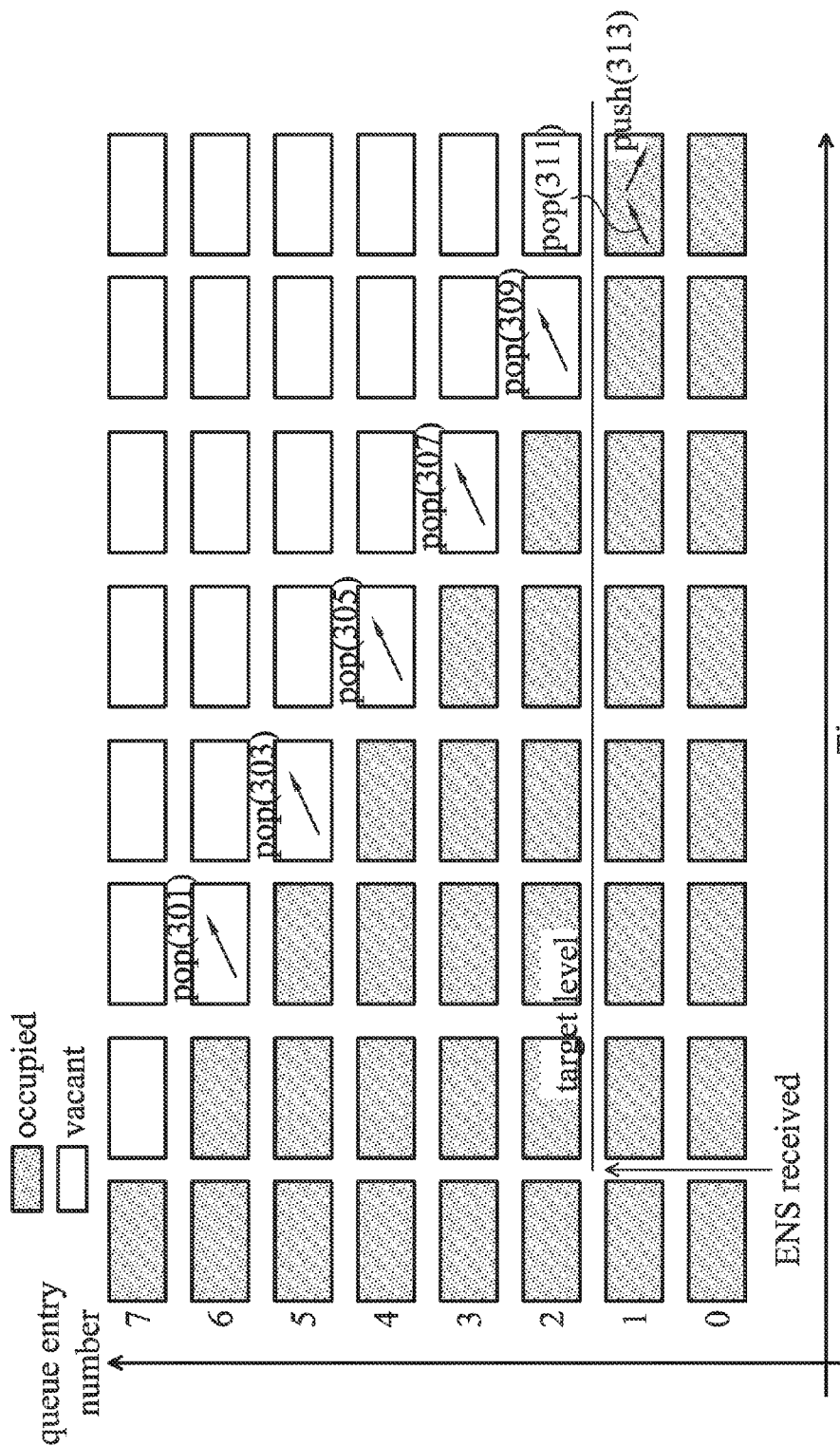
FIG. 3 illustrates how occupancy of a queue for storing commands for a DRAM is decreased to a target level according to some embodiments of the invention.
Figure 4:
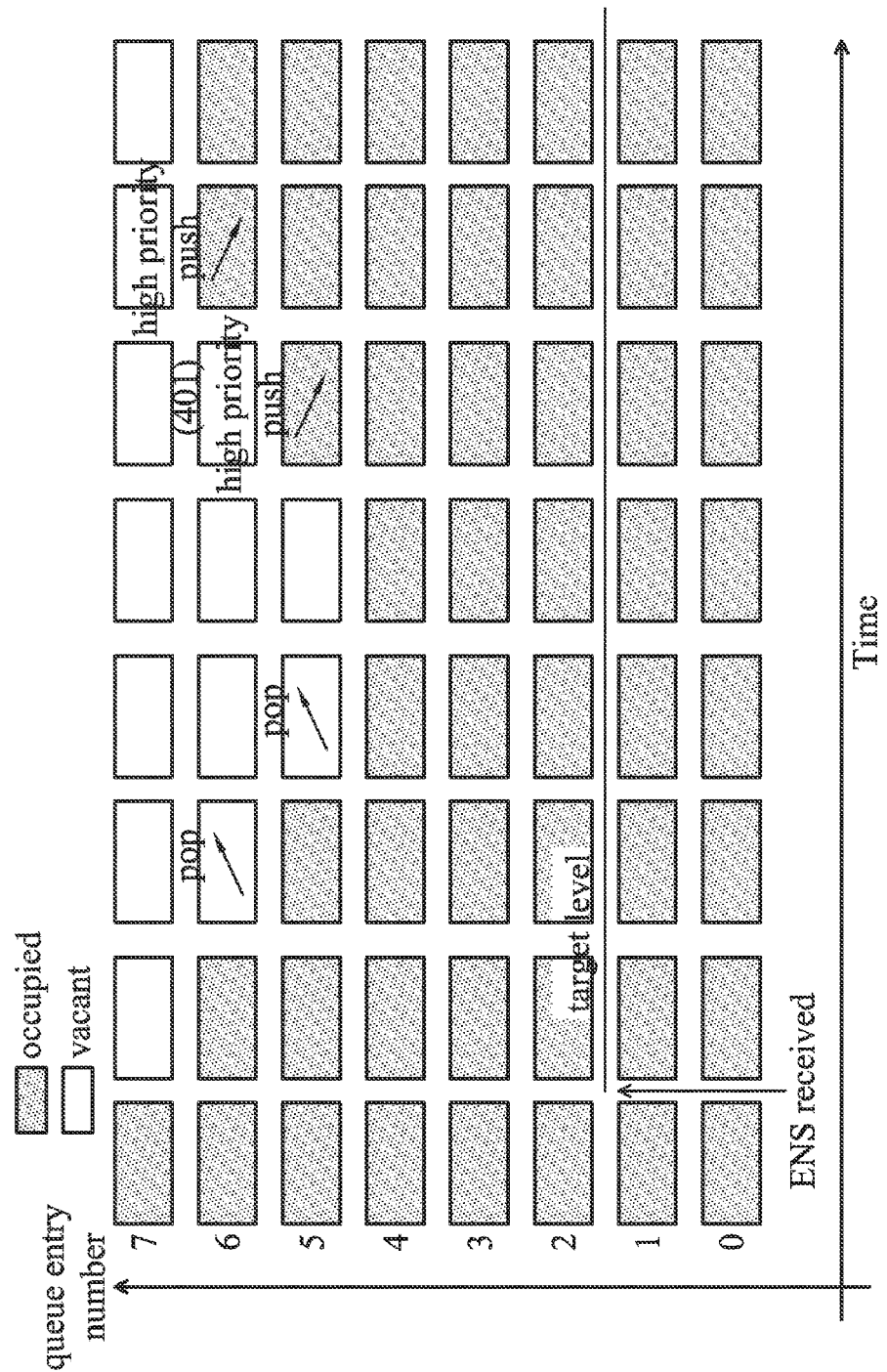
FIG. 4 illustrates how occupancy of a queue for storing commands for a DRAM is decreased to a target level according to some embodiments of the invention.
Figure 5:
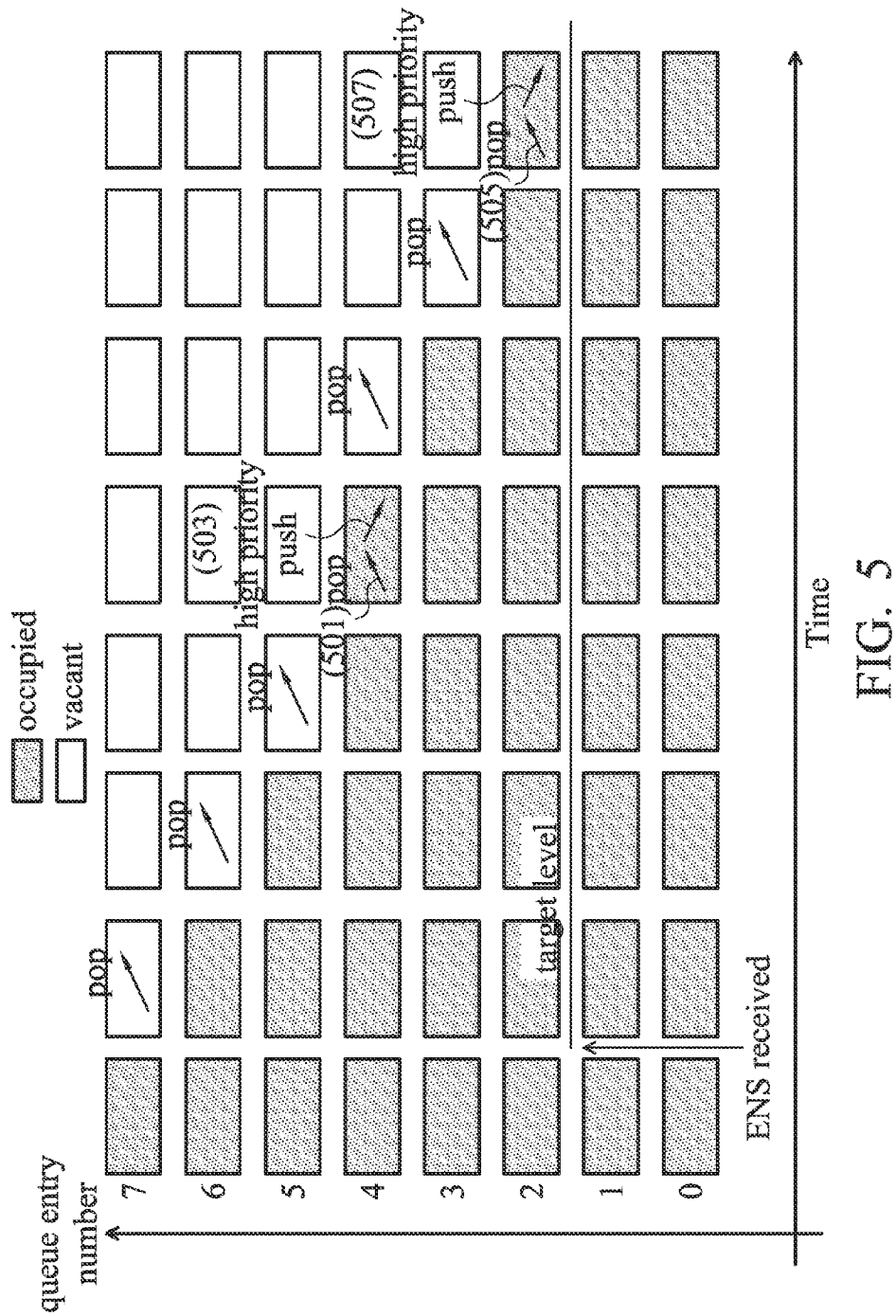
FIG. 5 illustrates how occupancy of a queue for storing commands for a DRAM is decreased to a target level according to some embodiments of the invention.

FIGS. 3 through 5 illustrate how the DRAM controller 201 manages to decrease the occupancy of the queue 207 upon receiving the early notification signal ENS (and preferably before receiving the clock frequency switch signal CFSS). Referring to FIG. 3, the DRAM controller 201 forbids all push requests before a target level (i.e. 2 occupied entries) for the queue 207 is reached. When there are more than 2 entries in the queue 207, the DRAM controller 201 only "pops" (e.g. 301 through 311) rather than "pushes"; and when data stored in the first entry is popped (i.e. 311; and the $2^{nd}$ through the $7^{th}$ entry are all empty), a push request 313 is allowed. Thus, according to an embodiment of the invention, the DRAM controller 201 declines any push request on the queue 207 before the target level is reached.

Referring to FIG. 4, the DRAM controller accepts push requests of high-priority while at the same time trying to pop entries of the queue 207 into the DRAM 210 so that the occupancy of the queue 207 can still be decreased to the target level. A high-priority push request usually comes from a computing unit demanding real-time computing results; otherwise, the system may suffer obvious performance loss. Thus, in another embodiment of the invention, the DRAM controller 201 accepts a high-priority push request (e.g. 401) on the queue 207 before the target level is reached (and after the early notification signal ENS is received).

Referring to FIG. 5, the DRAM accepts a high-priority push request conditionally in contrast to FIG. 4. Shown in FIG. 5, it can be seen that a high-priority push request 503 on the queue 207 is accepted following a pop operation 501 before the target level is reached. Similarly, a high-priority push request 507 is allowed following a pop operation 505 before the target level is reached.

Figure 6:
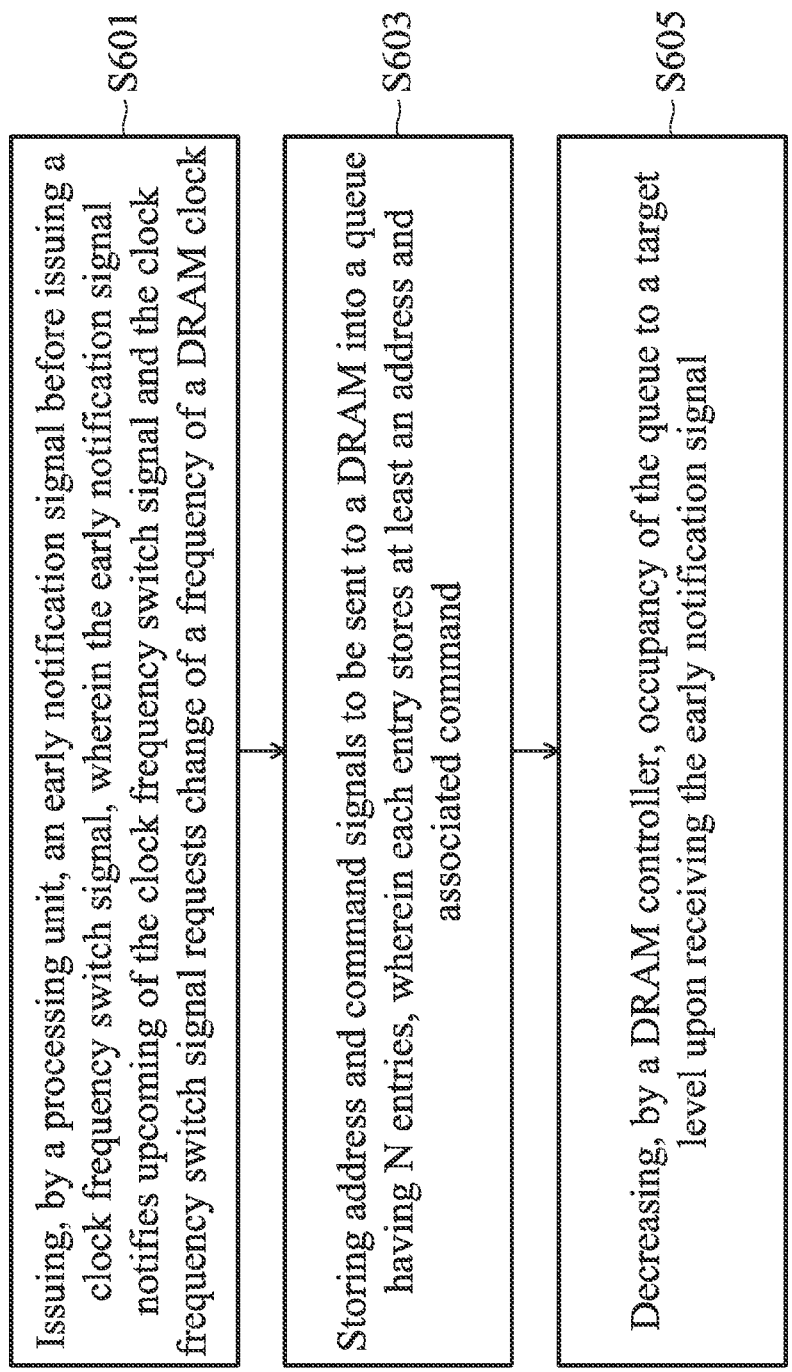
FIG. 6 is a flow chart illustrating a DRAM accessing method according to an embodiment of the invention.

FIG. 6 is a flow chart illustrating a DRAM accessing method according to an embodiment of the invention. In step S601, an early notification signal is issued before a clock frequency switch signal is issued, wherein the early notification signal notifies upcoming of the clock frequency switch signal and the clock frequency switch signal requests a change of frequency of a DRAM clock. In step S603, address and command signals to be sent to a DRAM are stored into a queue having N entries, wherein each entry stores at least an address and associated command. In step S605, occupancy of the queue is decreased gradually to a target level upon receiving the early notification signal. By using the word gradually, we mean that it may take some time to decrease the occupancy of the queue to the target level.

The method in FIG. 6 may be performed by hardware (e.g., circuitry, dedicated logic, programmable logic, microcode, application specific integrated circuits (ASICs), field-programmable gate arrays (FPGAs), etc.), software (e.g., instructions run on a processing device), or a combination thereof. In one embodiment, the method is performed by the DRAM subsystem 200 of FIG. 2.

The operations of the flow diagram of FIG. 6 have been described with reference to the exemplary embodiments of FIGS. 2 through 5. However, it should be understood that the operations of the flow diagrams of FIG. 6 can be performed by embodiments of the invention other than those discussed with reference to FIGS. 2 through 5, and the embodiments discussed with reference to FIGS. 2 through 5 can perform operations that are different than those discussed with reference to the flow diagrams. While the flow diagrams of FIG. 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through thermal sensors and circuits (either dedicated circuits, or general purpose circuits, which operate under the control of one or more processors and coded instructions), which will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computing system for accessing a dynamic random access memory (DRAM), the computing system comprising:
    a processing circuit, configured for issuing an early notification signal before issuing a clock frequency switch signal, wherein the early notification signal notifies upcoming of the clock frequency switch signal and the clock frequency switch signal requests a change of frequency of a DRAM clock;
    a queue comprising N entries, wherein N is a positive integer and each entry stores at least an address and an associated command to be sent to the DRAM; and
    a DRAM controller, configured to control access to the DRAM, wherein the DRAM controller manages to decrease occupancy of the queue to a target level upon receiving the early notification signal,
    wherein the target level mandates at most M out of N entries of the queue be occupied, wherein M is a positive integer smaller than N.

2. The computing system of claim 1, wherein the DRAM controller declines any push request on the queue before the target level is reached.

3. The computing system of claim 1, wherein the DRAM controller accepts a high-priority push request on the queue before the target level is reached.

4. The computing system of claim 1, wherein the DRAM controller accepts a high-priority push request on the queue following a pop operation on the queue before the target level is reached.

5. The computing system of claim 1, wherein the DRAM controller maintains at least X cycles of the DRAM clock between adjacent pop operations on the queue before the changing of the frequency of the DRAM clock, wherein X is a positive value.

6. The computing system of claim 5, wherein the DRAM controller maintains at least Y cycles of the DRAM clock between adjacent pop operations on the queue after the changing of the frequency of the DRAM clock, wherein Y is a positive value that is different from X.

7. A computing system for accessing a dynamic random access memory (DRAM), the computing system comprising:
    a processing circuit, configured for issuing an early notification signal before issuing a clock frequency switch signal, wherein the early notification signal notifies upcoming of the clock frequency switch signal and the clock frequency switch signal requests a change of frequency of a DRAM clock;
    a queue comprising N entries, wherein N is a positive integer and each entry stores at least an address and an associated command to be sent to the DRAM; and
    a DRAM controller, configured to control access to the DRAM, wherein the DRAM controller manages to decrease occupancy of the queue to a target level upon receiving the early notification signal,
    wherein after receiving the clock frequency switch signal from the processing circuit, the DRAM controller forbids any push request on the queue as the occupancy of the queue remains non-zero.

8. The computing system of claim 7, wherein when the occupancy of the queue falls to zero after receiving the clock frequency switch signal, the DRAM controller issues a clearance signal to the processing circuit to indicate that the frequency of the DRAM clock can be changed.

9. The computing system of claim 8, wherein the processing circuit switches the frequency of the DRAM clock from a first frequency to a second frequency upon receiving the clearance signal.

10. A dynamic random access memory (DRAM) accessing method, the DRAM accessing method comprising:
    issuing, by a processing circuit, an early notification signal before issuing a clock frequency switch signal, wherein the early notification signal notifies upcoming of the clock frequency switch signal and the clock frequency switch signal requests a change of frequency of a DRAM clock;
    storing address and command signals to be sent to a DRAM into a queue having N entries, wherein each entry stores at least an address and associated command; and
    decreasing gradually, by a DRAM controller, occupancy of the queue to a target level upon receiving the early notification signal,
    wherein at least X cycles of the DRAM clock between adjacent pop operations on the queue is maintained before the changing of the frequency of the DRAM clock, wherein X is a positive value.

11. The DRAM accessing method of claim 10, wherein the target level mandates at most M out of N entries of the queue be occupied, wherein M is a positive integer smaller than N.

12. The DRAM accessing method of claim 11, wherein any push request on the queue is declined before the target level is reached.

13. The DRAM accessing method of claim 11, wherein a high-priority push request on the queue is accepted before the target level is reached.

14. The DRAM accessing method of claim 11, wherein a high-priority push request on the queue following a pop operation on the queue is accepted before the target level is reached.

15. The DRAM accessing method of claim 10, wherein after receiving the clock frequency switch signal from the processing circuit, any push request on the queue is forbidden as the occupancy of the queue remains non-zero.

16. The DRAM accessing method of claim 15, wherein when the occupancy of the queue falls to zero after receiving the clock frequency switch signal, a clearance signal is issued to the processing circuit to indicate that the frequency of the DRAM clock can be changed.

17. The DRAM accessing method of claim 16, wherein the frequency of the DRAM clock is switched, by the processing circuit, from a first frequency to a second frequency upon receiving the clearance signal.

18. The thermal control method of claim 10, wherein at least Y cycles of the DRAM clock between adjacent pop operations on the queue is maintained after the changing of the frequency of the DRAM clock, wherein Y is a positive value that is different from X.

* * * * *